US009094285B2

(12) United States Patent
Gorkemli et al.

(10) Patent No.: US 9,094,285 B2
(45) Date of Patent: Jul. 28, 2015

(54) AUTOMATIC DISCOVERY OF MULTIPLE CONTROLLERS IN SOFTWARE DEFINED NETWORKS (SDNS)

(71) Applicant: ARGELA YAZILIM VE BILISIM TEKNOLOJILERI SAN. VE TIC. A.S., Istanbul (TR)

(72) Inventors: Burak Gorkemli, Istanbul (TR); Murat Parlakisik, Istanbul (TR); Nazli Guney, Istanbul (TR); Seyhan Civanlar, Istanbul (TR); Oguz Sunay, Istanbul (TR); Uygar Ozen, Istanbul (TR); Melih Karaman, Istanbul (TR); Bulent Kaytaz, Istanbul (TR)

(73) Assignee: ARGELA YAZILIM VE BILISIM TEKNOLOJILERI SAN. VE TIC. A.S. (TR)

( * ) Notice: Subject to any disclaimer, the term of this patent is extended or adjusted under 35 U.S.C. 154(b) by 370 days.

(21) Appl. No.: 13/750,038

(22) Filed: Jan. 25, 2013

(65) Prior Publication Data

US 2014/0211661 A1 Jul. 31, 2014

(51) Int. Cl.
*H04L 12/751* (2013.01)
*H04L 12/715* (2013.01)
*H04L 12/24* (2006.01)
*H04L 12/933* (2013.01)

(52) U.S. Cl.
CPC .......... *H04L 45/02* (2013.01); *H04L 45/64* (2013.01); *H04L 41/12* (2013.01); *H04L 49/15* (2013.01)

(58) Field of Classification Search
None
See application file for complete search history.

(56) References Cited

U.S. PATENT DOCUMENTS

| | | | | |
|---|---|---|---|---|
| 2006/0146810 A1* | 7/2006 | Bui et al. | | 370/386 |
| 2009/0138577 A1 | 5/2009 | Casado et al. | | |
| 2010/0172237 A1* | 7/2010 | Savage et al. | | 370/228 |
| 2010/0315975 A1* | 12/2010 | Arkin | | 370/254 |
| 2011/0317701 A1 | 12/2011 | Yamato et al. | | |
| 2012/0099591 A1* | 4/2012 | Kotha et al. | | 370/392 |
| 2012/0250496 A1 | 10/2012 | Kato | | |
| 2013/0034104 A1* | 2/2013 | Yedavalli et al. | | 370/400 |
| 2013/0268686 A1* | 10/2013 | Wang et al. | | 709/228 |
| 2013/0318243 A1* | 11/2013 | Chinthalapati et al. | | 709/226 |
| 2014/0029410 A1* | 1/2014 | Kannan | | 370/218 |
| 2014/0241367 A1* | 8/2014 | Ichino | | 370/392 |

OTHER PUBLICATIONS

"geni Exploring Networks of the Future: What is GENI?" Global Environment for Network Innovation web site, <http://geni.net>, 4 pgs.
Tootoonchian et al., "HyperFlow: A Distributed Control Plane for OpenFlow," <http://static.usenix.org>, 6 pgs.
Gude et al., "NOX: Towards an Operating System for Networks," SIGCOMM Computer Communication Review 38, 3 (2008), p. 105-110.
OpenFlow Switch Specification, V 1.3.0, Jun. 25, 2012, <http://opennetworking.org>.
The Transport Layer Security (TLS) Protocol Version 1.2, RFC 5246, published Aug. 2009, 208pgs.

* cited by examiner

*Primary Examiner* — Yemane Mesfin
*Assistant Examiner* — Peter Chen
(74) *Attorney, Agent, or Firm* — IP Authority, LLC; Ramraj Soundararajan

(57) ABSTRACT

Controllers in a Software Defined Network (SDN) automatically discover and authenticate each other as part of the control plane operations, without any need for manual configuration of other controllers. The new capability of such controllers is based on Controller-Advertisement messages transferred between controllers in the same or different SDNs. In doing so, multiple controllers can be used for load sharing, improved reliability under failure of a controller by enabling seamless take over and recovery. Moreover, controllers can cooperate to enable end-to-end services to work across multiple SDNs. Controller-Advertisement messages are also used to check the health statuses of discovered controllers in the same or different SDNs.

17 Claims, 9 Drawing Sheets

AUTOMATIC DISCOVERY OF MULTIPLE CONTROLLERS IN SOFTWARE DEFINED NETWORKS (SDNS)

BACKGROUND OF THE INVENTION

1. Field of Invention

The disclosed invention generally relates to the controller component of a Software Defined Network (SDN). In particular, it relates to such controllers automatically discovering and authenticating each other as part of the control plane operations, without any need for manual configuration of other controllers as it is being done in prior art. The system of this invention is a new capability of the controller that receives Controller-Advertisement messages from other controllers in the same or different SDN, performing authentication and subsequently performing control plane information exchange. The Controller-Advertisement messages used for discovery are also used to periodically check the health of the pool of discovered controllers. Multiple controllers can be used for load sharing, improved reliability under failure of a controller by enabling seamless take over and recovery. Also, controllers can cooperate to enable end-to-end services to work across multiple SDNs.

2. Discussion of Related Art

Software-Defined Networking (SDN) is a new paradigm where the control of computer and communication networks is accomplished via programmatic interfaces. There are a number of approaches to SDN. In the most popular approach, the data and control planes that typically reside in a switch are separated and the control plane is moved to a separate device, commonly referred to as the controller as described in the article "OpenFlow: Enabling Innovation in Campus Networks" by Nick McKeown et al., which appeared in ACM SIGCOMM Computer Communication Review, vol. 38, no. 2, April 2008 and also in the Pre-Grant Application by Casado et al. (2009/0138577). When triggered, the controller calculates the most appropriate route through the network between two nodes and programs all switches along this route accordingly. The controller can be a physical server, a virtual machine or an appliance. There can be multiple controllers in a computer network in this approach. It is possible to divide the network into regions and have different controllers control each region. It is also possible to have multiple controllers control a single switch for reliability and/or performance issues, where each controller may control different ports, or different flow types, or flows with different end nodes. In this approach, a well-defined protocol, OpenFlow, is used for communication between the network forwarding devices and the controller. The controller also has a northbound application programming interface so that different, custom control applications that use the OpenFlow data may be installed on the controller. This approach is advocated by the Open Networking Foundation (ONF) that aims to standardize the OpenFlow protocol. The latest version of the OpenFlow protocol may be accessed via the ONF web page. It is also possible to use a protocol other than OpenFlow to enable proper operation of this approach. FIG. 1 illustrates the Open-Flow-based SDN concept with a single controller 100 and a plurality of switches 109, 110, 111, and 112. In FIG. 1, dotted lines 101, 102, 103 and 104 represent control plane connections between the controller and the switches, while solid lines 105, 106, 107, and 108 represent the switch-to-switch data plane connections. All interactions in FIG. 1 between the controller and the switches use a clearly defined protocol, such as OpenFlow. This protocol allows for the control plane operations, wherein the controller programs the switches to specify the route of data paths (or flows, slices). The controller programs the switch by simply uploading one or more forwarding table(s) (or table entries).

In a second approach to SDN, virtual switches, as described in the Pre-Grant Application by Casado et al. (2010/0257263), are deployed as part of an overlay network on top of the existing network infrastructure using protocols such as VXLAN or NVGRE, which are defined in IETF Internet Drafts, draft-mahalingam-dutt-dcops-vxlan-00.txt and draft-sridharan-virtualization-nvgre-01.txt, respectively. In this approach, the data and control planes are still kept separate in the overlay, and the controller (or a group of controllers) is used to control the virtual switches.

In a third SDN approach, the data and control planes are not physically separated. Instead, every forwarding device in the network uses programmatic interfaces for network control, on which custom control applications may be installed. This vendor specific approach may be visualized as having an SDN controller in each forwarding device and using a vendor-specific protocol for communication between the controller and the forwarder.

The Pre-Grant Publication to Kato (2012/025049) describes a Load Distribution System, Load Distribution Method, and Program for SDN. In Kato, the load distribution amongst controllers is made possible using a proxy server that is situated between the switches and the controllers. The proxy server enables transparency of the different controllers to each of the switches. It also enables seamless load-balancing amongst the controllers unbeknownst to the switches in the network.

The Pre-Grant Publication to Yamato et al. (2011/0317701) describes one possible method to formulate routing decisions in a SDN architecture where multiple controllers are deployed. The routing decision, as calculated by the controller that controls the switch from which the route originates, is communicated to the other, relevant controllers in the network by this controller using a message that includes the forwarding path information.

In Kato as well as Yamata et al., as with the remainder of the prior art, when multiple controllers are used, a manual configuration step is needed to program each controller with the information of the other controller(s). The present invention eliminates this manual step by providing a system and method that allow each controller to automatically discover and authenticate other controllers in the network.

Embodiments of the present invention are an improvement over prior art systems and methods.

SUMMARY OF THE INVENTION

The present invention provides a method for a first controller in a first subnetwork to automatically discover a second controller of a second subnetwork, said first subnetwork further comprising at least a first switch and said second subnetwork further comprising at least a second switch, said method as implemented in said first controller comprising the steps of: (a) receiving a message from said first switch identifying activation of a first port, which is due to establishment of a connection between a first port in said first switch and a second port in said second switch; (b) generating a Controller-Advertisement message carrying information required to identify and access said first controller; (c) forwarding said generated Controller-Advertisement message from said first controller to said first switch, said first port in said first switch further forwarding said Controller-Advertisement message to said second port in said second switch, said second switch further forwarding said Controller-Advertisement message to said second controller along with an identification of said second port over which said Controller-Advertisement message was received; wherein said second controller in said second subnetwork identifies said first controller in said first subnetwork based on information carried in said Controller-Advertisement, and said second controller generating a Controller Information Base (CIB) entry containing information required to identify and access said first controller.

Reciprocally (and independently of the Controller-Advertisement message originating from the first controller), the present invention also provides the steps of (a) receiving a message from said second switch identifying activation of a second port, which is due to establishment of a connection between a second port in said second switch and a first port in said first switch; (b) generating a Controller-Advertisement message carrying information required to identify and access said second controller; (c) forwarding said generated Controller-Advertisement message from said second controller to said second switch, said second port in said second switch further forwarding said Controller-Advertisement message to said first port in said first switch, said first switch further forwarding said Controller-Advertisement message to said first controller along with an identification of said first port over which said Controller-Advertisement message was received; wherein said first controller in said first subnetwork identifies said second controller in said second subnetwork based on information carried in said Controller-Advertisement, and said first controller generating a CIB entry containing information required to identify and access said second controller.

The present invention also provides a method to check health of automatically discovered controllers comprising the steps of: (a) a first controller generating a first Controller-Advertisement message carrying the information required to identify and access said first controller when a new switch port becomes active; (b) said first controller sending said generated first Controller-Advertisement to a first switch having said newly activated port; (c) said first controller, reciprocally and independently of said first Controller-Advertisement message, receiving at least a second Controller-Advertisement message from at least a second controller; (d) said first controller periodically generating a third unsolicited Controller-Advertisement message with its access information and solicit-flag set to check health of said second controller; (e) said first controller receiving at least a fourth Controller-Advertisement message from said second controller indicating health information of said second controller, wherein first controller's CIB is updated with said health information.

The present invention also provides a method for a first controller in a first subnetwork to automatically discover a second controller of a second subnetwork, said first subnetwork further comprising at least a first switch and said second subnetwork further comprising at least a second switch, said method as implemented in said first controller comprising the steps of: (a) receiving a message from said first switch identifying activation of a first port, which is due to establishment of a connection between a first port in said first switch and a second port in said second switch; (b) generating a Controller-Advertisement message carrying information required to identify and access said first controller; (c) forwarding said generated Controller-Advertisement message from said first controller to said first switch, said first port in said first switch further forwarding said Controller-Advertisement message to said second port in said second switch, said second switch further forwarding said Controller-Advertisement message to said second controller along with an identification of said second port over which said Controller-Advertisement message was received; (d) if said first controller and said second controller are a single controller, then: (i) updating said single controller's Network Information Base (NIB) with a new entry showing new connection information between said first switch, first port and said second switch, second port, utilizing the information carried in the optional switch-id and port-no fields of said Controller-Advertisement message, and (ii) discarding any Controller-Advertisement messages that are looped to itself; (e) if said first controller and said second controller are different controllers, then said second controller: (i) identifying said first controller using information carried in said Controller-Advertisement message originated from said first controller; and (ii) generating a new CIB entry containing information for said first controller.

The present invention also provides an article of manufacture having computer readable storage medium comprising computer readable program code executable by a computer to implement a method for a first controller in a first subnetwork to automatically discover a second controller of a second subnetwork, said first subnetwork further comprising at least a first switch and said second subnetwork further comprising at least a second switch, said medium comprising: (a) computer readable program code executed by said computer to receive a message from said first switch identifying activation of a first port, which is due to establishment of a connection between a first port in said first switch and a second port in said second switch; (b) computer readable program code executed by said computer to generate a Controller-Advertisement message carrying information required to identify and access said first controller; (c) computer readable program code executed by said computer to forward said generated Controller-Advertisement message from said first controller to said first switch, said first port in said first switch further forwarding said Controller-Advertisement message to said second port in said second switch, said second switch further forwarding said Controller-Advertisement message to said second controller along with an identification of said second port over which said Controller-Advertisement message was received; wherein said second controller in said second subnetwork identifies said first controller in said first subnetwork based on information carried in said Controller-Advertisement, and said second controller generating a CIB entry containing information required to identify and access said first controller.

Method and system for controllers to discover each other within the same Software Defined Network (SDN), where there are at least two controllers; or across a plurality of interconnected SDNs, where each SDN is controlled by one or more controllers. The method comprises the steps of: a switch controlled by a controller in an SDN establishing a new data connection to another switch controlled by another controller in the same or different SDN, each of these two interconnected switches sending a notification message to its respective controller about the newly established data connection; each controller responding to the received notification message by a Controller-Advertisement message carrying information required to identify and access the controller; the switch receiving the Controller-Advertisement message passing that message to the other interconnected switch which in turn propagates it to the other controller. Mutually doing so, each controller learns the other controller's connection information to establish a direct (peer controller) control plane connection, to authenticate and share control plane data such as routing table or service capabilities. While OpenFlow defines control plane messages to enable the controller to switch dialog, this invention describes additional control plane messages between controllers, which can be used with protocols other than OpenFlow.

DESCRIPTION OF THE PREFERRED EMBODIMENTS

Figure 1:
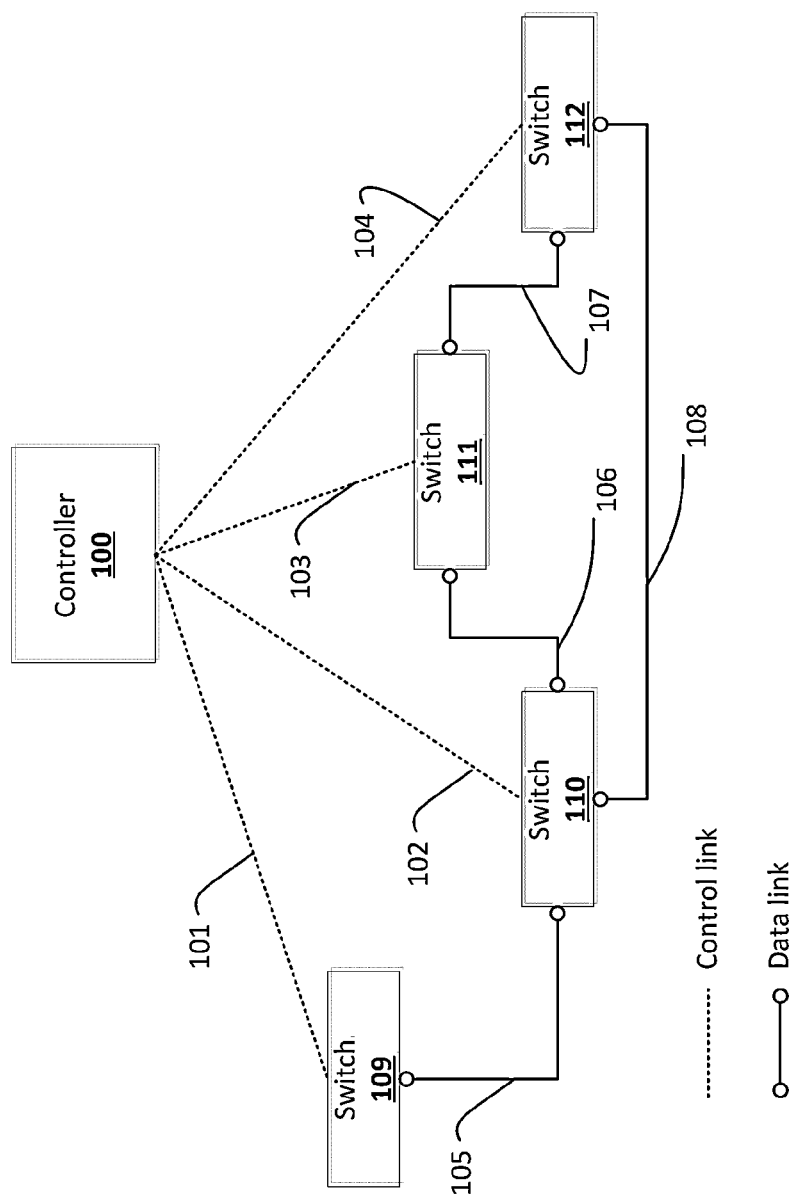
FIG. 1 illustrates a prior art SDN.

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

In the prior art, when multiple controllers are used in a Software Defined Network (SDN) (or several SDNs are interconnected, each with different controllers), a manual configuration step is needed to program each controller with the information of the other controller(s). The present invention eliminates that manual step by providing a system and method that allows each controller to automatically discover and authenticate other controllers in the network. An Autonomous System (AS) may be represented as a single SDN. Alternatively, it may be comprised of many interconnected SDNs. Thus, two SDNs that are interconnected may be in the same AS or in different Autonomous Systems. If the interconnected SDNs are in the same AS, their controllers may exchange all the control information they contain. Doing so, the controllers will be replicas of each other. However, policies may be defined to limit the control plane information each such controller shares with the other controllers. If the SDNs are in different Autonomous Systems, their controllers will only exchange limited control information. For example, the internal network of the AS may be represented to the foreign controller in a more summarized or aggregated form. Also, there will be processes in place to ensure the other controller is trusted. The method of exchange of control information amongst controllers, once they discover each other, could be similar to exchange of routing information amongst routers in the classical Internet using various routing protocols, and therefore is kept outside the scope of this patent application.

The controller discovery process covered in this invention can be triggered by a change in the network (for example, when a new connection is established) and/or, periodically, at regular intervals. The former is more efficient in terms of messages injected into the network, but at the same time, it is more prone to message losses. Although some rules are defined in the following paragraphs to tolerate potential losses, it is advisable to perform controller discovery at regular intervals that are not short, besides being triggered by changes in the network.

The information gathered through the controller discovery process can be stored in the CIB, which is similar to the NIB used to store the information required to control the underlying switches. CIB can be considered as a table whose entries contain the information necessary to identify and access the discovered controllers, as shown in TABLE I below:

TABLE I

An example CIB

| Remote Controller-ID | Remote Controller-IP | Local Switch-ID | Local Port-No | Status |
|---|---|---|---|---|
| Controller1 | Controller1-IP | Switch2 | p20 | Live |
| Controller3 | Controller3-IP | Switch3 | p37 | Live |
| Controller4 | Controller4-IP | Switch3 | p39 | Live |

Below are the possible fields of a CIB entry that stores the access information for a discovered controller:

Controller-ID: ID of the discovered controller, which should be unique within the scope of the discovery process.

Controller-IP: IP address of the discovered controller.

Switch-ID: ID of the local switch from where the discovered controller can be accessed. This local switch is managed by the controller that maintains the CIB.

Port-no: Port number of the local switch from where the discovered controller can be accessed.

Status: Status of the discovered controller, which can take values such as 'Live', 'Dead', 'Not Accessible', or any other status values depending on the requirements.

The controllers listed in the CIB may change status under different conditions. For example, upon receiving a Controller-Advertisement message from a remote controller, the status of the remote controller will be set as 'Live', whereas not receiving a Controller-Advertisement message from a previously discovered remote controller in the health-check process will change the status to 'Dead'. Alternatively, if a data link that was previously used to interconnect the switches which enabled the control plane connectivity between the controllers is broken (i.e., the port of the switch in the CIB table above associated with a remote controller) and access between the controllers thereby becomes unavailable, the status of the remote controller will be set as 'Not Accessible', upon receiving a message indicating the corresponding change in the network. While there are other values that can possibly be used for representing the status of a controller, it may also suffice to use only two values, which are 'Live' and 'Dead'.

The discovery process involves a single message, namely the Controller-Advertisement message, which is used by controllers to advertise their presence together with connection information. Since there is no explicit reply message of Controller-Advertisement, message losses can be tolerated by adhering to the following rules:

A controller that receives a Controller-Advertisement message with its solicit-flag set should respond with its own Controller-Advertisement message with its solicit-flag cleared, unless it does not want to participate in the controller discovery process.

A controller that has sent a Controller-Advertisement message over a connection should resend the advertisement message with its solicit-flag set, in case no remote Controller-Advertisement message is received from the same connection after a specific period.

The Controller-Advertisement message will have the following structure, in addition to the IP header, if encapsulated as an IP packet:

```
CONTROLLER_ADVERTISEMENT <
    IP-Header: <
        src-addr: Controller-IP;
        dst-addr: All-nodes multicast address; >
    controller-id: Controller-ID;
    solicit-flag:   ON/OFF;
    algorithm-id:  ID of the cryptographic algorithm
                    that generates the signature;   # Optional
    signature:  cryptographically generated
                    authentication code;            # Optional
    switch-id: Switch-ID;       # Optional
    port-no: port-ID;           # Optional
    optional-fields; >          # Optional
``` src-addr: Carries the access information for the controller that sends the advertisement message.

dst-addr: Multicast address to reach all nodes.

controller-id: ID of the controller, which should be unique within the multicast scope.

solicit-flag: This flag determines if the receiver of the advertisement message should respond with its own advertisement message or not. If set, the receiving controller should prepare its own Controller-Advertisement message and respond with it to the sender, unless it does not want to participate in the controller discovery process. If not set, no response should be sent. Typically, controller discovery is performed with the solicit-flag not set. On the other hand, Controller-Advertisement for a controller's health-check (towards an already discovered controller) should have its solicit-flag set to force a response from the discovered controller. Similarly, a Controller-Advertisement message, which is resent after a specific period because no remote Controller-Advertisement message is received from the newly activated switch-port, should have its solicit-flag set.

algorithm-id: ID of the cryptographic algorithm that generates the signature. This can be either a symmetric-key or an asymmetric-key (public-key) algorithm. This field is optional together with the following signature field.

signature: Cryptographically generated code that authenticates the advertisement message. This code can be constructed by the given cryptographic algorithm, using the src-addr, controller-id, switch-id and port-no fields. The controller that receives a Controller-Advertisement message with an existing signature value can validate the authenticity and the integrity of the received message. Since this field is optional, it is up to the controller to discard a received advertisement message with a null signature value.

switch-id: ID of the switch, from where the advertisement message is sent. The ID should be unique within the scope of the controller that originates the message. This field can be used for local topology discovery, that is, the discovery of connections between the switches managed by the same controller, together with port-no field. If a controller receives its own Controller-Advertisement message that is previously constructed, then it can utilize the switch-id and port-no fields to learn the existing connection between the sending and the receiving switches. This field is optional.

port-no: ID of the port, from where the advertisement message is sent. The ID should be unique within the scope of the sending switch. This field is optional.

optional-fields: Additional fields that can be utilized for controller-to-controller information exchange, which may be performed during the discovery process rather than being done after completing the discovery process. ID of the subnetwork that a controller manages and capability information of a controller are examples to such optional fields.

Controller Discovery Process

When a new data connection is established between two switches in an SDN network, a physical connection is established between the ports of these switches. Upon such a change in the port status (i.e., the port changing status from idle to active) of the said switches, they notify their respective controllers of the corresponding change. Then, the controllers can act accordingly to discover the change in the network.

Figure 2A:
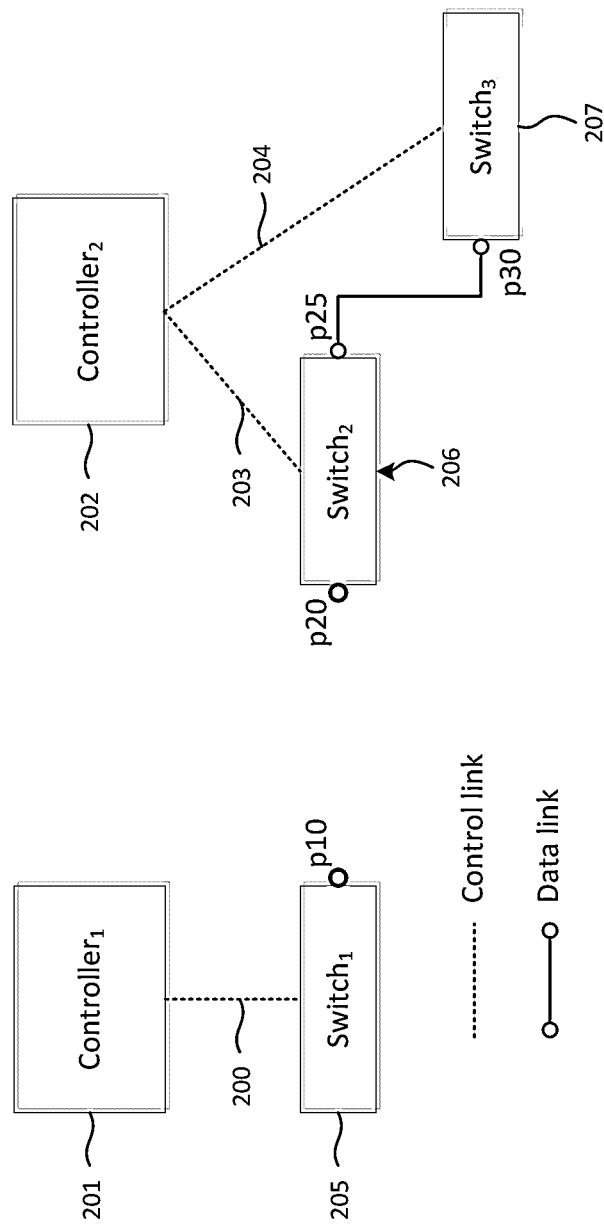
FIG. 2A illustrates a SDN with two subnetworks managed by different controllers.

FIG. 2A illustrates the scenario where there exist two subnetworks managed by different controllers, Controller$_1$ 201 and Controller$_2$ 202. These subnetworks may belong to the same or different SDNs. In this scenario, when two subnetworks interconnect, their controllers (i.e., Controller$_1$ 201 on the first subnetwork and Controller$_2$ 202 on the second subnetwork) will need to discover one another, and authenticate/exchange routing information to properly route packets from one subnetwork to the other.

Figure 2B:
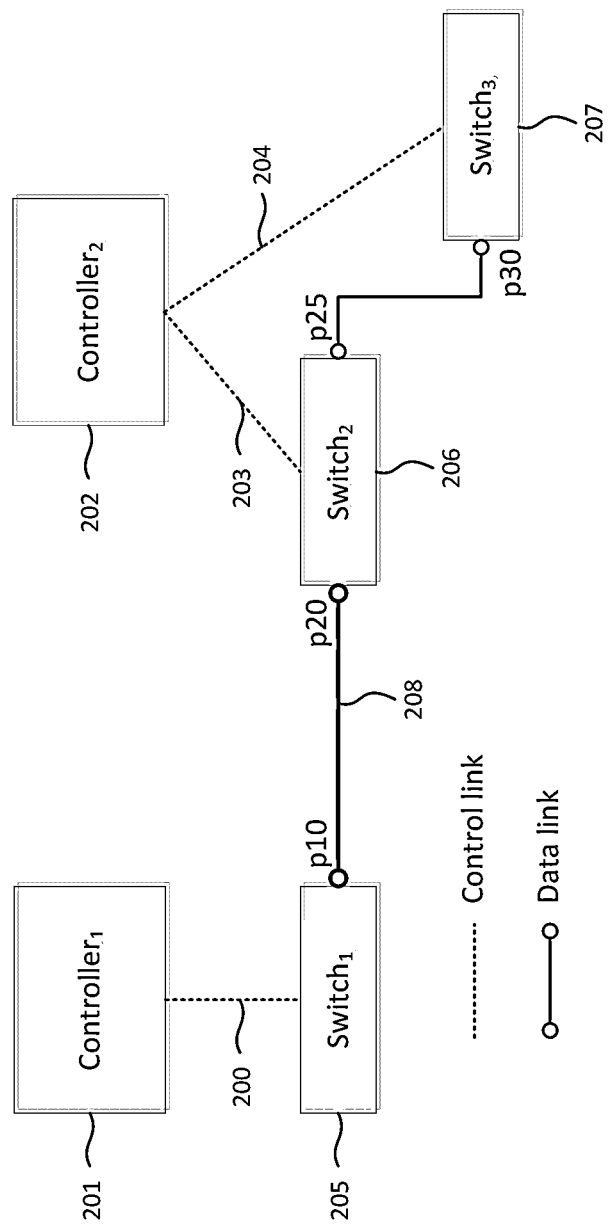
FIG. 2B illustrates the establishment of a data connection between a first port of a first switch and a second port of a second switch.
Figure 3A:
FIGS. 3A-B illustrate a flowchart outlining the steps describing the controller discovery process.
Figure 3B:
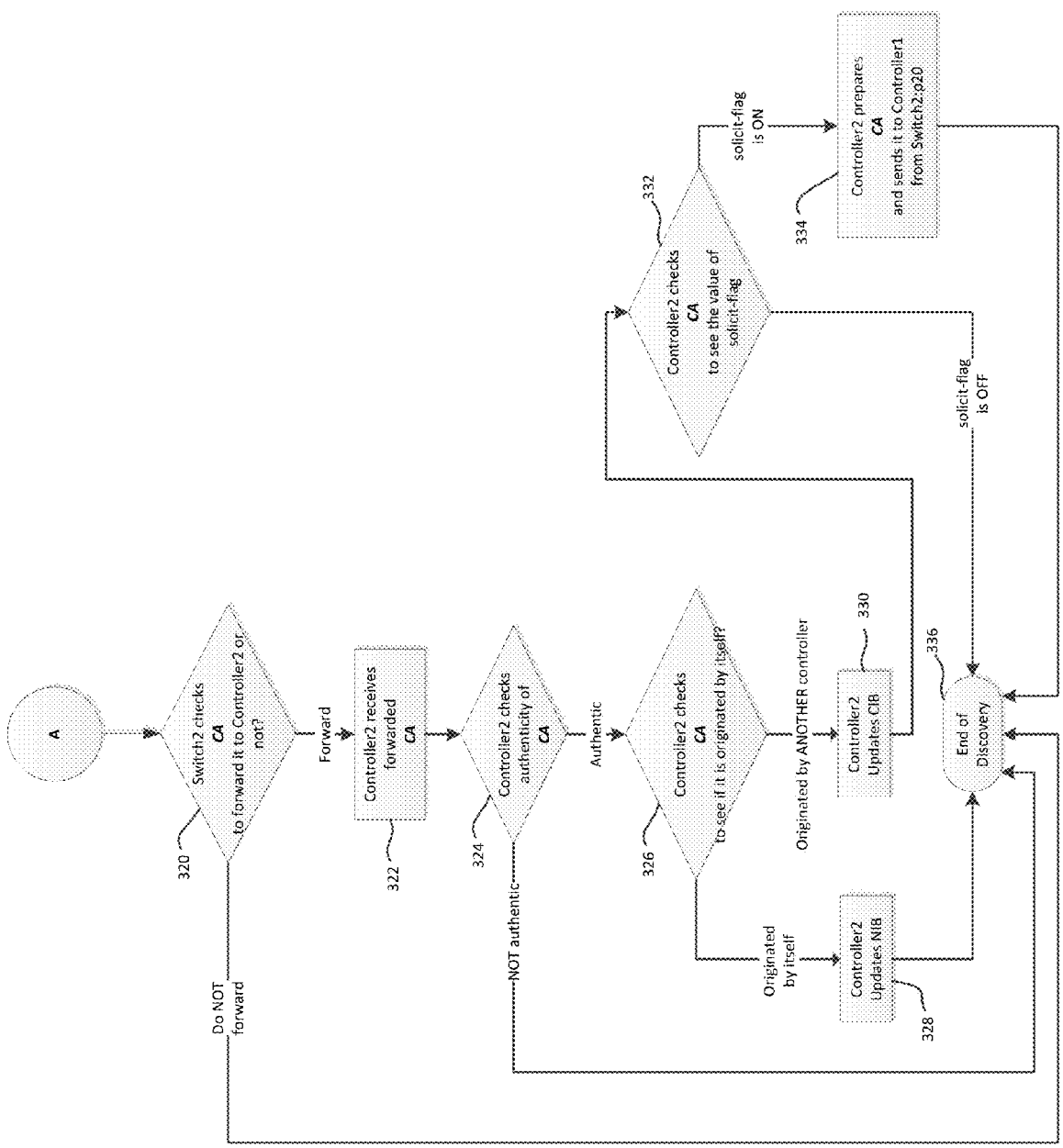

In FIG. 2A, Switch$_1$ 205 is controlled by Controller$_1$ 201 on the first subnetwork, whereas Switch$_2$ 206 and Switch$_3$ 207 are controlled by Controller$_2$ 202 on the second subnetwork. The OpenFlow protocol is run on control links between the controllers and the switches, shown in dashed lines numbered with 200, 203, and 204. Initially, as shown in FIG. 2A, Switch$_1$ 205 and Switch$_2$ 206 are not connected, and Controller$_1$ 201 and Controller$_2$ 202 are not aware of each other. Thereafter, as depicted in FIG. 2B, a data connection, numbered with 208, is established between port p10 of Switch$_1$ 205 and port p20 of Switch$_2$ 206. When this connection is established, the controller discovery process is automatically triggered. An exemplary flowchart, showing the discovery process initiated by Controller$_1$ 201 upon connecting ports p10 and p20, is depicted in FIG. 3A and FIG. 3B. It should be noted that although FIGS. 3A-B depict a discovery process initiated by Controller$_1$ 201, a reciprocal discovery process (not shown) is also initiated by Controller$_2$ 202, and is within the scope of the present invention.

Figure 4:
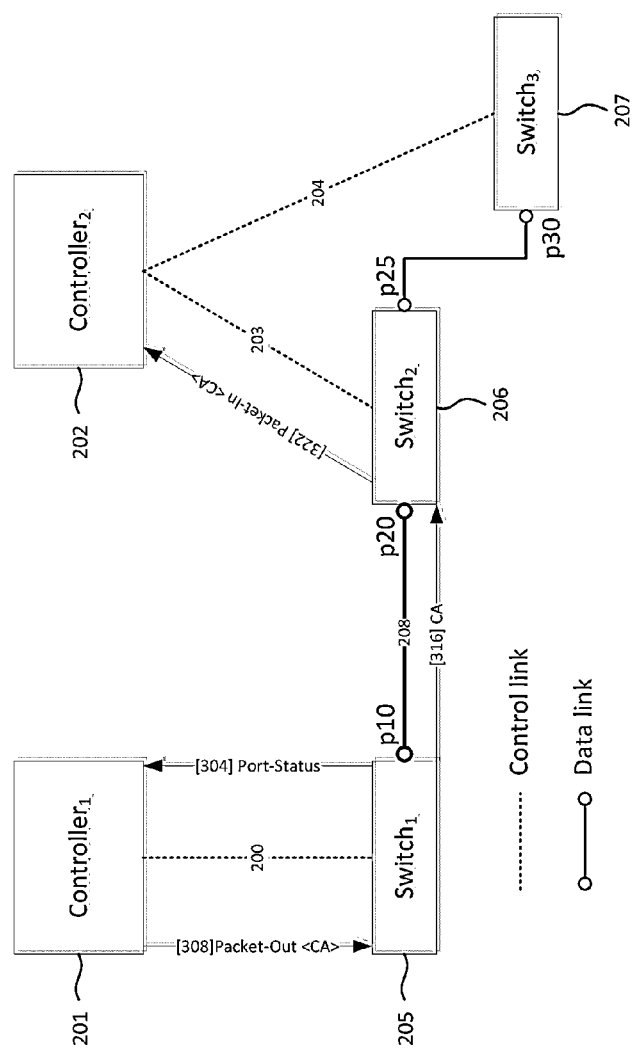
FIG. 4 depicts the sequence of messages involved in one example of a controller discovery process.

The steps below describe the controller discovery process initiated by Controller$_1$ 201, as illustrated in FIGS. 3A-B. Reference is also made to FIG. 4 as it depicts the sequence of messages.

Step 300: Begin method.

Step 302: Switch$_1$ 205, port p10 is connected to Switch$_2$ 206, port p20.

Step 304: Upon port p10 being connected to port p20, Switch$_1$ 205 sends Port-Status message to Controller$_1$ 201. This OpenFlow message is intended to inform the controller that a previously idle port is now active.

For example, the corresponding OpenFlow (version 1.0.0) message from Switch₁ 205 to Controller₁ 201 contains:

```
OFPT_PORT_STATUS <
    reason: OFPPR_MODIFY;
    port-no: p10;
    state: OFPPS_STP_LISTEN >
```

Step 306: In response to receiving the Port-Status message sent from Switch₁ 205, Controller₁ 201 prepares a Controller-Advertisement message that carries its own ID and optionally the ID of Switch₁ 205 and port p10, according to an aspect of this invention. The solicit-flag should be cleared (i.e., its value should be OFF), since this is the initial message. This message will carry the IP address of Controller₁ 201 in its IP header. The content of the prepared Controller-Advertisement message is as follows:

```
CONTROLLER_ADVERTISEMENT <
    IP-Header: <
        src-addr: Controller1-IP;
        dst-addr: All-nodes; >
    controller-id: Controller1;
    solicit-flag: OFF;
    algorithm-id: Algorithm1;
    signature: authentication-code;
    switch-id: Switch1;
    port-no: p10; >
```

Step 308: Controller₁ 201 hands over the Controller-Advertisement message to Switch₁ 205, to be sent out from port p10. Using OpenFlow protocol, this message can be sent inside the Packet-Out message, as shown below:

```
OFPT_PACKET_OUT <
    type: OFPAT_OUTPUT;
    port: p10;
    data: CONTROLLER_ADVERTISEMENT < ... > >
```

Step 310: Controller₁ 201 starts a timer $t_{CA}$, so as to resend the Controller-Advertisement message prepared in step 306 unless a remote Controller-Advertisement message has been received from port p10 of Switch₁ 205 before $t_{CA}$ times out. This timer is for tolerating potential message losses.

Step 312: Controller₁ 201 checks to see if a remote Controller-Advertisement message—in this case prepared by Controller₂ 202—has been received before $t_{CA}$ times out. If no advertisement message is received in that period, then Controller₁ 201 resends the Controller-Advertisement message prepared in step 306, but this time with solicit-flag set (i.e., the solicit-flag is ON).

Step 314: A remote Controller-Advertisement message, which is prepared by Controller₂ 202, is received at port p10 of Switch₁ 205. When remote controller, namely Controller₂ 202, is discovered, there is no need to resend the Controller-Advertisement message prepared in Step 306.

Step 316: Switch₁ 205 sends the Controller-Advertisement message prepared by Controller₁ 201 to Switch₂ 206 from port p10.

Step 318: Switch₂ 206 receives the Controller-Advertisement message sent by Switch₁ 205 on port p20.

Step 320: Switch₂ 206 checks the Controller-Advertisement message to determine whether or not to forward the message to Controller₂ 202. The check involves looking up its forwarding table to see if there exists an entry that matches the message header. For the controller discovery to proceed, Switch₂ 206 should forward the message to Controller₂ 202, because either there is no flow entry matching the message or the matching flow entry dictates the switch to forward the message to the controller. Otherwise, the discovery process ends in step 336. This may occur because the Controller₂ 202 has a policy that restricts the controller discovery process or there may also be other reasons not covered here.

Step 322: In case Switch₂ 206 decides to forward the Controller-Advertisement message to Controller₂ 202, it does so by utilizing the Packet-In message of the OpenFlow protocol. So, Controller₂ 202 receives the advertisement message carried inside the OpenFlow (version 1.0.0) Packet-In message, as shown below:

```
OFPT_PACKET_IN <
    in_port: p20;
    data: CONTROLLER_ADVERTISEMENT < ... > >
```

Step 324: Controller₂ 202 checks the authenticity of the received Controller-Advertisement message using the algorithm-id and signature fields of the message. If the message turns out to be valid, the process continues with Step 326. Otherwise, the advertisement message is discarded, and the discovery process ends in step 336. Also, if no authentication data is presented in the advertisement message, it is up to the controller—in this case, Controller₂ 202—to discard the message, or to continue with the discovery process.

Step 326: Controller₂ 202 checks the controller-id field of the Controller-Advertisement message, to determine if the message was originated by itself.

Figure 6:
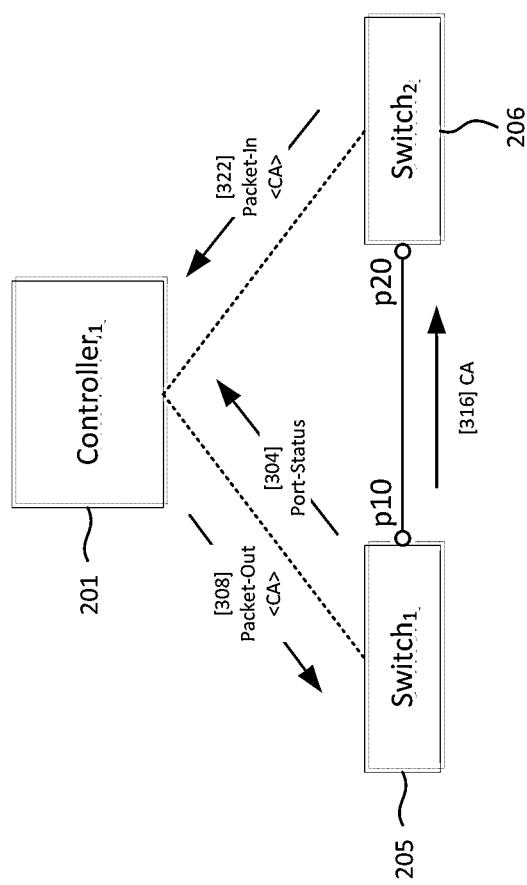
FIG. 6 illustrates the messaging sequence when a new connection is established between switches that are managed by the same controller.

Step 328: If Controller₂ 202 determines that the received Controller-Advertisement message was its own message that is previously originated, as depicted in FIG. 6, then it can utilize the switch-id and port-no fields of the advertisement message and the in port field of the Packet-In message to discover the connection established between the sending and receiving switches. After that, Controller₂ 202 can update its NIB accordingly, without making any changes in the CIB.

Step 330: If Controller₂ 202 determines that the received Controller-Advertisement message was originated by another controller—which is originated by Controller₁ 201 in our case, then Controller₂ 202 updates its CIB to reflect the newly discovered controller—Controller₁ 201. Assuming that the Controller₂ 202 CIB was empty at the beginning, then the status of the CIB will be as in TABLE II after discovering Controller₁ 201:

TABLE II

Controller₂ 202 CIB after discovering Controller₁ 201

| Remote Controller-ID | Remote Controller-IP | Local Switch-ID | Local Port-No | Status |
|---|---|---|---|---|
| Controller1 | Controller1-IP | Switch2 | p20 | Live |

Since a reciprocal discovery process is also initiated by Controller₂ 202, the Controller₁ 201 CIB will be as shown in TABLE III (shown below) after the discovery of Controller₂ 202, assuming that the CIB was empty at the beginning

TABLE III

Controller₁ 201 CIB after discovering Controller₂ 202

| Remote Controller-ID | Remote Controller-IP | Local Switch-ID | Local Port-No | Status |
|---|---|---|---|---|
| Controller2 | Controller2-IP | Switch1 | p10 | Live |

Step 332: $Controller_2$ 202 checks the solicit-flag of the received Controller-Advertisement message. If the value is OFF (i.e., if the solicit-flag is cleared), then the discovery process ends in step 336.

Step 334: If the solicit-flag of the received Controller-Advertisement message is ON (i.e., if the solicit-flag is set), then it means that $Controller_1$ 201 has requested a Controller-Advertisement message from $Controller_2$ 202. In that case, $Controller_2$ 202 prepares a Controller-Advertisement with its own information and solicit-flag cleared, and then sends the message to $Controller_1$ 201 from port p20 of $Switch_2$ 206.

Step 336: The discovery process ends for the established connection.

Figure 5:
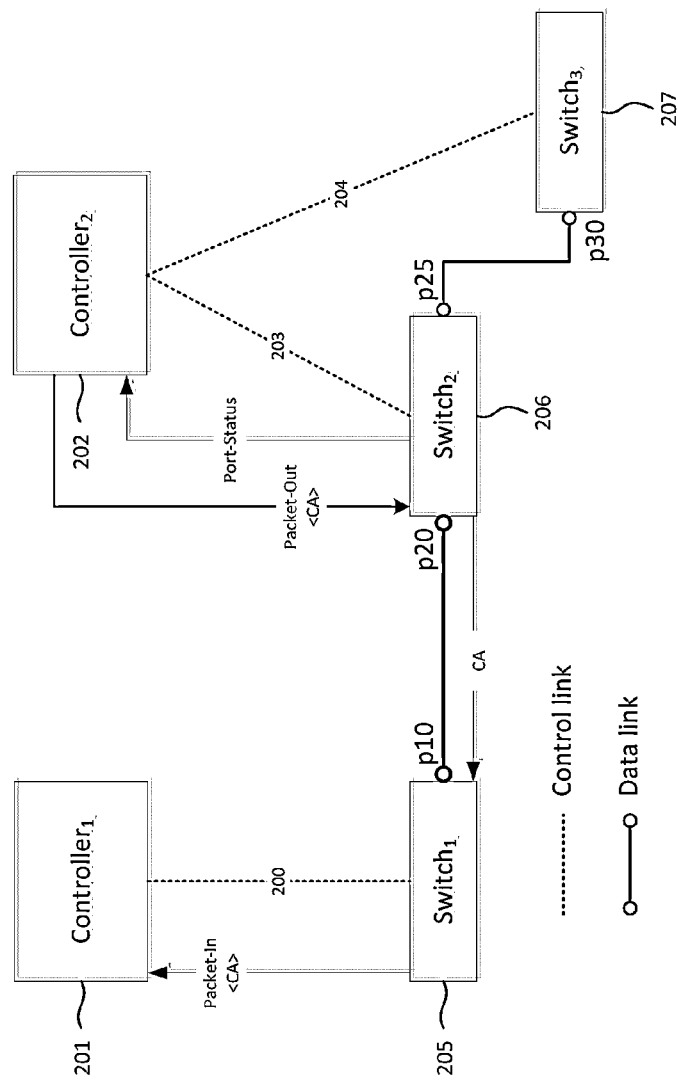
FIG. 5 depicts the sequence of messages involved in another example of a controller discovery process.

FIG. 4 depicts the Controller-Advertisement message traverses for the $Controller_1$ 201 initiated discovery process as follows: [$Controller_1$ 201]→[$Switch_1$ 205]→[$Switch_2$ 206]→[$Controller_2$ 202]. For the reciprocal process, where $Controller_2$ 202 initiates discovery, the Controller-Advertisement message traverses are as follows: [$Controller_2$ 202]→[$Switch_2$ 206]→[$Switch_1$ 205]→[$Controller_1$ 201]. This scenario is depicted in FIG. 5. In case $Controller_1$ 201 and $Controller_2$ 202 are a single controller (i.e., just $Controller_1$ 201), the Controller-Advertisement message traverses, as per FIG. 6, as follows: [$Controller_1$ 201]→[$Switch_1$ 205]→[$Switch_2$ 206]→[$Controller_1$ 201].

Figure 7:
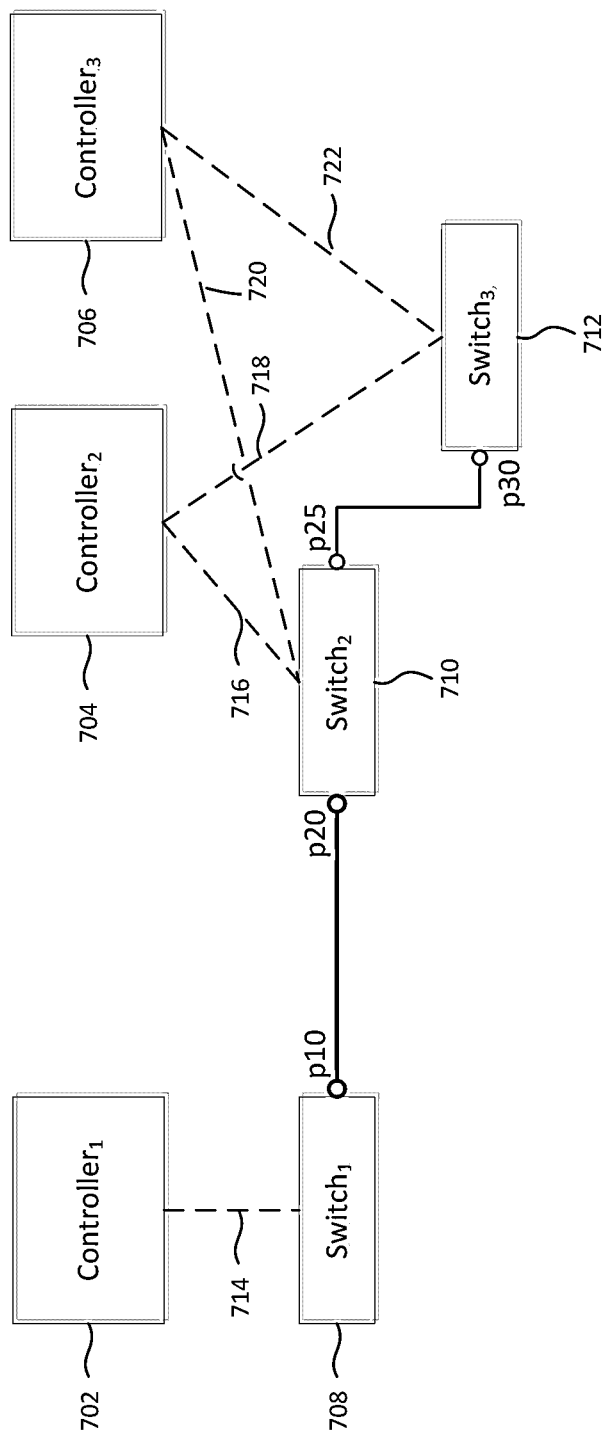
FIG. 7 illustrates a SDN with two subnetworks managed by different controllers, where the second subnetwork is managed by two controllers for redundancy and/or performance issues.

It is also possible for a switch to be managed by multiple controllers, for redundancy and/or performance issues. FIG. 7 illustrates such a scenario, where a first subnetwork is managed by $Controller_1$ 702 and a second subnetwork is managed by $Controller_2$ 704 and $Controller_3$ 706. In this scenario, dotted lines 714, 716, 718, 720, and 722 represent various control links. It should be noted that while $Switch_1$ 708 has only one control link with $Controller_1$ 702, $Switch_2$ 710 has two control links 716 and 720, one for each of the controllers, $Controller_2$ 704 and $Controller_3$ 706 (i.e., $Switch_2$ 710 is managed by $Controller_2$ 704 and $Controller_3$ 706). Similarly, $Switch_3$ 712 has two control links 718 and 722, one for each of the controllers, $Controller_2$ 704 and $Controller_3$ 706 (i.e., $Switch_3$ 712 is also managed by $Controller_2$ 704 and $Controller_3$ 706). The controller discovery process covered in this invention covers such a scenario, such that the Controller-Advertisement message prepared by $Controller_1$ 702 is forwarded to both $Controller_2$ 704 and $Controller_3$ 706 by $Switch_2$ 710. Moreover, $Controller_2$ 704 and $Controller_3$ 706 both prepare Controller-Advertisement messages to be forwarded to $Switch_1$ 708 and eventually to $Controller_1$ 702, when notified by $Switch_2$ 710 of the change in the port status (i.e., the port changing status from idle to active).

Additionally, the present invention provides for an article of manufacture comprising computer readable program code contained within implementing one or more modules to automatically discover multiple controllers in software defined networks (SDNs). Furthermore, the present invention includes a computer program code-based product, which is a storage medium having program code stored therein which can be used to instruct a computer to perform any of the methods associated with the present invention. The computer storage medium includes any of, but is not limited to, the following: CD-ROM, DVD, magnetic tape, optical disc, hard drive, floppy disk, ferroelectric memory, flash memory, ferromagnetic memory, optical storage, charge coupled devices, magnetic or optical cards, smart cards, EEPROM, EPROM, RAM, ROM, DRAM, SRAM, SDRAM, or any other appropriate static or dynamic memory or data storage devices.

Implemented in computer program code based products are software modules for: a) receiving a message from said first switch identifying activation of a first port, which is due to establishment of a connection between a first port in said first switch and a second port in said second switch; b) generating a Controller-Advertisement message carrying information required to identify and access said first controller; c) forwarding said generated Controller-Advertisement message from said first controller to said first switch, said first port in said first switch further forwarding said Controller-Advertisement message to said second port in said second switch, said second switch further forwarding said Controller-Advertisement message to said second controller along with an identification of said second port over which said Controller-Advertisement message was received; wherein said second controller in said second subnetwork identifies said first controller in said first subnetwork based on information carried in said Controller-Advertisement, and said second controller generating a Controller Information Base (CIB) entry containing information required to identify and access said first controller.

Implemented in computer program code based products are software modules for reciprocally (and independently of the Controller-Advertisement message originating from the first controller): (a) receiving a message from said second switch identifying activation of a second port, which is due to establishment of a connection between a second port in said second switch and a first port in said first switch; (b) generating a Controller-Advertisement message carrying information required to identify and access said second controller; (c) forwarding said generated Controller-Advertisement message from said second controller to said second switch, said second port in said second switch further forwarding said Controller-Advertisement message to said first port in said first switch, said first switch further forwarding said Controller-Advertisement message to said first controller along with an identification of said first port over which said Controller-Advertisement message was received; wherein said first controller in said first subnetwork identifies said second controller in said second subnetwork based on information carried in said Controller-Advertisement, and said first controller generating a Controller Information Base (CIB) entry containing information required to identify and access said second controller.

Also, implemented in computer program code based products are software modules for: a) receiving a message from said first switch identifying activation of a first port, which is due to establishment of a connection between a first port in said first switch and a second port in said second switch; b) generating a Controller-Advertisement message carrying information required to identify and access said first controller; c) forwarding said generated Controller-Advertisement message from said first controller to said first switch, said first port in said first switch further forwarding said Controller-Advertisement message to said second port in said second switch, said second switch further forwarding said Controller-Advertisement message to said second controller along with an identification of said second port over which said Controller-Advertisement message was received; d) if said first controller and said second controller are a single controller, then: (i) updating said single controller's Network Information Base (NIB) with a new entry showing new connection information between said first switch and said second switch, utilizing the information carried in the optional switch-id and port-no fields of said Controller-Advertisement message, and (ii) discarding any Controller-Advertisement messages that are looped to itself; e) if said first controller and said second controller are different controllers, then said second controller: (i) identifying said first controller using information carried in said Controller-Advertisement message originated from said first controller; and (ii) generating a new CIB entry containing information for said first controller.

CIB Maintenance

Once a controller has discovered a number of neighboring controllers, it should keep track of their statuses, for proper operation. This can be achieved by sending Controller-Advertisement messages, with solicit-flag set, to each of the previously discovered controllers, and waiting for them to send their Controller-Advertisement messages in return.

Returning to the discussion of FIG. 2 through FIG. 5 and considering the CIB given in TABLE IV (which is the same as the example in TABLE I), Controller$_2$ 202 will prepare a Controller-Advertisement message with solicit-flag set, carrying its own access information, and then send the advertisement message to each of the controllers in the CIB. As neighboring controllers receive the Controller-Advertisement message with solicit-flag set, they will respond to Controller$_2$ 202 with their Controller-Advertisement messages, with solicit-flag cleared. Upon receiving the advertisement messages from neighboring controllers, Controller$_2$ 202 will maintain the statuses of these controllers. This process should be repeated at regular intervals for proper operation.

TABLE IV

Controller$_2$ 202 CIB

| Remote Controller-ID | Remote Controller-IP | Local Switch-ID | Local Port-No | Status |
| --- | --- | --- | --- | --- |
| Controller1 | Controller1-IP | Switch2 | p20 | Live |
| Controller3 | Controller3-IP | Switch3 | p37 | Live |
| Controller4 | Controller4-IP | Switch3 | p39 | Live |

In addition to sending advertisement messages per CIB entry periodically, network change events should be processed to maintain the statuses of discovered controllers. For instance, upon receiving a Port-Status message showing that a port has become inactive, the accessibility states of the neighboring controllers that are accessible through that port should be changed accordingly.

Secure Controller-to-Controller Connection

After discovering each other, two controllers should build a secure connection between themselves, like Transport Layer Security (TLS), over which controller-to-controller information such as routing, service and capability information will be exchanged. Establishing the secure connection is well-defined and beyond the scope of this invention.

Controller-to-Controller Information Exchange

After completing the discovery process and establishing a secure end-to-end connection, the two controllers may need to exchange information such as:

1—Routing information (NIB): The controllers may share a part of (aggregate) or all the routing information that they maintain, so as to enable packet routing between the networks that are in their control.

2—Network capability information: The controllers may exchange the capabilities of their networks, such as the maximum bandwidth or minimum latency that can be offered, so as to support end-to-end quality of service (QoS).

3—Controller capability information: Each controller may have different hardware and software-specific capabilities. Accordingly, each controller may be capable of handling only specific types of flows, and may have upper bounds on the traffic load that it can handle.

4—Service offerings: The controller may provide certain services to the users of its subnetwork (such as location based services), which it may decide to make visible to the discovered controller so as to offer these services to the users of the other subnetwork, as well.

It is also possible to include some or all of this information in the Controller-Advertisement messages as part of the discovery process. This can be achieved by using the optional-fields defined in the Controller-Advertisement message.

CONCLUSION

A system and method has been shown in the above embodiments for the effective implementation of automatic discovery of multiple controllers in software defined networks (SDNs). While various preferred embodiments have been shown and described, it will be understood that there is no intent to limit the invention by such disclosure, but rather, it is intended to cover all modifications falling within the spirit and scope of the invention, as defined in the appended claims. For example, the present invention should not be limited by number of sub-networks, number of controllers, number of switches, number of switches per controller, number of controllers per switch, software/program, computing environment, or specific computing hardware.

The invention claimed is:

1. A method for a first controller in a first subnetwork to automatically discover a second controller of a second subnetwork, said first subnetwork further comprising at least a first switch and said second subnetwork further comprising at least a second switch, said method as implemented in said first controller comprising the steps of:
   a) receiving a message from said first switch identifying activation of a first port, which is due to establishment of a connection between said first port in said first switch and a second port in said second switch;
   b) generating a Controller-Advertisement message carrying information required to identify and access said first controller;
   c) forwarding said generated Controller-Advertisement message from said first controller to said first switch, said first port in said first switch further forwarding said Controller-Advertisement message to said second port in said second switch, said second switch further forwarding said Controller-Advertisement message to said second controller along with an identification of said second port over which said Controller-Advertisement message was received;
   wherein said second controller in said second subnetwork identifies said first controller in said first subnetwork based on said information carried in said Controller-Advertisement message, and said second controller generating a Controller Information Base (CIB) entry containing said information required to identify and access said first controller.

2. The method of claim 1, further comprising the step of said second controller checking to see if there is authentication information embedded in said forwarded Controller-Advertisement message in step (c) and, if so, authenticating the message before making any said changes to said CIB to ensure the authenticity and the integrity of the received message.

3. The method of claim 1, further comprising the step of said second controller checking to see if a solicit flag is set in said Controller-Advertisement message and, if so, generating another Controller-Advertisement message with solicit flag cleared, said another Controller-Advertisement message carrying information required to identify and access said second controller.

4. The method of claim 1, wherein said first controller and said first switch are on the same hardware.

5. The method of claim 1, wherein said first and/or second controller is comprised of at least two controllers attached to the same switch through separate control links.

6. The method of claim 1, wherein Controller-Advertisement messages further comprises capability and/or responsibility information associated with said first controller.

7. The method of claim 1, wherein said second controller and said second switch are on the same hardware.

8. The method of claim 1, wherein said second subnetwork is on the same Software Defined Network (SDN) as said first subnetwork.

9. The method of claim 1, wherein said second subnetwork is on a different Software Defined Network (SDN) as that of said first subnetwork.

10. The method of claim 1, wherein said received message in (a) is the Port-Status message of the OpenFlow protocol.

11. The method of claim 1, wherein said Controller-Advertisement message is forwarded from said first controller to said first switch in the Packet-Out message of the OpenFlow protocol.

12. The method of claim 1, wherein said Controller-Advertisement message is forwarded from said second switch to said second controller in the Packet-In message of the OpenFlow protocol.

13. The method of claim 1, wherein a third controller is part of said second subnetwork and said second switch further forwarding said Controller-Advertisement message to said third controller along with an identification of said second port over which said Controller-Advertisement message was received, wherein said third controller in said second subnetwork identifies said first controller in said first subnetwork based on information carried in said Controller-Advertisement message, and said third controller generating a CIB entry containing information required to identify and access said first controller.

14. The method of claim 13, further comprising the step of said third controller checking to see if a solicit flag is set in said Controller-Advertisement message and, if so, generating another Controller-Advertisement message with solicit flag cleared, said Controller-Advertisement message carrying access information required to identify and access said third controller.

15. A method for a first controller in a first subnetwork to automatically discover a second controller of a second subnetwork, said first subnetwork further comprising at least a first switch and said second subnetwork further comprising at least a second switch, said method as implemented in said first controller comprising the steps of:

a) receiving a message from said first switch identifying activation of a first port, which is due to establishment of a connection between said first port in said first switch and a second port in said second switch;

b) generating a Controller-Advertisement message carrying information required to identify and access said first controller;

c) forwarding said generated Controller-Advertisement message from said first controller to said first switch, said first port in said first switch further forwarding said Controller-Advertisement message to said second port in said second switch, said second switch further forwarding said Controller-Advertisement message to said second controller along with an identification of said second port over which said Controller-Advertisement message was received;

d) if said first controller and said second controller are a single controller, then:
　i. updating said single controller's Network Information Base (NIB) with a new entry showing new connection information between said first switch and said second switch, utilizing the information carried in the optional switch-id and port-no fields of said Controller-Advertisement message, and
　ii. discarding any Controller-Advertisement messages that are looped to itself.

e) if said first controller and said second controller are different controllers, then said second controller:
　i. identifying said first controller using information carried in said Controller-Advertisement message originated from said first controller; and
　ii. generating a new Controller Information Base (CIB) entry containing information for said first controller.

16. An article of manufacture having computer readable non-transitory storage medium comprising computer readable program code executable by a computer to implement a method for a first controller in a first subnetwork to automatically discover a second controller of a second subnetwork, said first subnetwork further comprising at least a first switch and said second subnetwork further comprising at least a second switch, said medium comprising:

a) computer readable program code executed by said computer to receive a message from said first switch identifying activation of a first port, which is due to establishment of a connection between said first port in said first switch and a second port in said second switch;

b) computer readable program code executed by said computer to generate a Controller-Advertisement message carrying information required to identify and access said first controller;

c) computer readable program code executed by said computer to forward said generated Controller-Advertisement message from said first controller to said first switch, said first port in said first switch further forwarding said Controller-Advertisement message to said second port in said second switch, said second switch further forwarding said Controller-Advertisement message to said second controller along with an identification of said second port over which said Controller-Advertisement message was received;

wherein said second controller in said second subnetwork identifies said first controller in said first subnetwork based on said information carried in said Controller-Advertisement message, and said second controller generating a Controller Information Base (CIB) entry containing said information required to identify and access said first controller.

17. An article of manufacture having computer readable storage non-transitory medium comprising computer readable program code executable by a computer to implement a method for a first controller in a first subnetwork to automatically discover a second controller of a second subnetwork, said first subnetwork further comprising at least a first switch and said second subnetwork further comprising at least a second switch, said method as implemented in said first controller comprising the steps of:

a) computer readable program code executed by said computer to receive a message from said first switch identifying activation of a first port, which is due to establishment of a connection between said first port in said first switch and a second port in said second switch;

b) computer readable program code executed by said computer to generate a Controller-Advertisement message carrying information required to identify and access said first controller;

c) computer readable program code executed by said computer to forward said generated Controller-Advertisement message from said first controller to said first switch, said first port in said first switch further forwarding said Controller-Advertisement message to said second port in said second switch, said second switch further forwarding said Controller-Advertisement message to said second controller along with an identification of said second port over which said Controller-Advertisement message was received;

d) if said first controller and said second controller are a single controller, then:

i. computer readable program code executed by said computer to update said single controller's Network Information Base (NIB) with a new entry showing new connection information between said first switch and said second switch, utilizing the information carried in the optional switch-id and port-no fields of said Controller-Advertisement message, and ii. computer readable program code executed by said computer to discard any Controller-Advertisement messages that are looped to itself.

e) if said first controller and said second controller are different controllers, then said second controller:

i. computer readable program code executed by said computer to identify said first controller using information carried in said Controller-Advertisement message originated from said first controller; and ii. computer readable program code executed by said computer to generate a new Controller Information Base (CIB) entry containing information for said first controller.

\* \* \* \* \*